(12) United States Patent
Krus et al.

(10) Patent No.: US 9,737,172 B2
(45) Date of Patent: Aug. 22, 2017

(54) GEARED GRINDING SYSTEMS, ADJUSTMENT MECHANISMS AND MILLS COMPRISING THE SAME

(71) Applicant: Chef'n Corporation, Seattle, WA (US)

(72) Inventors: Matthew Krus, Seattle, WA (US); Elliot Weber, Seattle, WA (US); Jason Rodman, Seattle, WA (US); David A. Holcomb, Seattle, WA (US)

(73) Assignee: Chef'n Corporation, Seattle, WA (US)

( * ) Notice: Subject to any disclaimer, the term of this patent is extended or adjusted under 35 U.S.C. 154(b) by 347 days.

(21) Appl. No.: 14/657,881

(22) Filed: Mar. 13, 2015

(65) Prior Publication Data

US 2015/0257600 A1 Sep. 17, 2015

Related U.S. Application Data

(60) Provisional application No. 61/952,546, filed on Mar. 13, 2014.

(51) Int. Cl.
*A47J 42/46* (2006.01)
*A47J 42/04* (2006.01)
*A47J 42/08* (2006.01)

(52) U.S. Cl.
CPC .............. *A47J 42/46* (2013.01); *A47J 42/04* (2013.01); *A47J 42/08* (2013.01)

(58) Field of Classification Search
CPC ............. A47J 42/46; A47J 42/04; A47J 42/08
See application file for complete search history.

(56) References Cited

U.S. PATENT DOCUMENTS

| 2,763,440 A * | 9/1956 | Johnson | A47J 42/04 241/157 |
| 2008/0093489 A1* | 4/2008 | Hadj-Chikh | A47J 42/04 241/169.1 |
| 2010/0187343 A1* | 7/2010 | Stasin | A47J 42/08 241/169.1 |
| 2011/0162538 A1* | 7/2011 | Wu | A47J 42/08 99/537 |
| 2013/0277473 A1* | 10/2013 | Delbridge | A47J 42/08 241/169.1 |

FOREIGN PATENT DOCUMENTS

DE 202007012380 U1 * 2/2008 ............. A47J 42/46

* cited by examiner

*Primary Examiner* — Mark Rosenbaum
(74) *Attorney, Agent, or Firm* — Seed IP Law Group LLP

(57) ABSTRACT

The present disclosure is directed to systems and apparatus for grinding spices and grains. One system includes a mill for grinding a spice or grain material, comprising a body and a handle rotatably coupled to the body. The handle is also coupled to an input of a speed boost assembly. An output of the speed boost assembly is coupled to a grind assembly, which includes a rasp. The speed boost assembly is configured to cause the rotational frequency of the rasp to be greater than a rotational frequency of the handle.

11 Claims, 5 Drawing Sheets

GEARED GRINDING SYSTEMS, ADJUSTMENT MECHANISMS AND MILLS COMPRISING THE SAME

BACKGROUND

Technical Field

This disclosure generally relates to grinding mechanisms, and more particularly to grinders or mills with high speed and adjustable grinding mechanisms for grinding materials, such as spices and grains.

Description of the Related Art

Traditional spice and grain mills are common household and kitchen tools. They often comprise a hollow cylindrical body with a grinding rasp and rasp ring at one end and a grind knob at the other. A grinder shaft typically runs along the central axis of the body and connects the rasp and knob together such that a user may hold the body and turn the knob, causing the rasp to rotate relative to the rasp ring and grind the material contained within the body. Most mills also provide a means for adjusting the grind coarseness between fine and coarse settings.

The means for adjusting the grind is usually an additional knob threaded onto an extreme end of the grinder shaft, either at the top, above the grind knob, or at the bottom, below the grinding rasp. In either case, to adjust the grind setting, a user must adjust their hold on the grinder, reposition their hands to grab the grind adjustment knob, and tighten or loosen the knob. The knob is usually a small nut that requires fine motor skill to adjust. In the case of a bottom mounted grind adjustment knob, the user's fingers usually get covered in spice or grain dust that may accumulate at the outlet of the mill. Once the user has adjusted the grind they must reposition their hands again before they resume grinding. If the grind needs additional adjustment, then the user must interrupt the grinding process again, reposition their hands, and make further adjustments with the grind adjustment knob. This traditional method for adjusting the grind coarseness is awkward and time consuming.

In existing mills, the turn handle or knob the user turns to grind the material connects directly to a shaft and the shaft then connects to a rasp such that for every rotation of the knob or handle, the rasp completes one rotation. In an effort to reduce the force necessary for grinding material, some mills include handles offset from the axis of rotation of the grind shaft, creating a lever arm and increasing the torque delivered to the grinder. Gear mechanisms have also been developed to increase the torque to the grinder. These gear mechanisms slow the grinding process because they reduce the output speed of the grinder such that a single rotation of the turn knob or handle causes less than one rotation of the rasp.

It is desirable to have a mill that allows for a simple, easy, and straightforward grind adjustment. Further, it is desirable to have a mill with a grind adjustment mechanism that does not require the user to significantly reposition their hands to change the grind setting. In addition, it is desirable to have a mill that quickly grinds spices and grains with a grinding mechanism that makes more than one rotation for each rotation of a turn knob or handle.

BRIEF SUMMARY

The present disclosure is directed to systems and apparatus for grinding spices and grains. One system includes a mill for grinding a spice or grain material, comprising a body and a handle rotatably coupled to the body. The handle is also coupled to an input of a speed boost assembly. An output of the speed boost assembly is coupled to a grind assembly, which includes a rasp. The speed boost assembly is configured to cause the rotational rate or displacement of the rasp to be greater than a rotational rate or displacement of the handle.

One system includes a body, a grind adjuster including at least one set of stepped detents and being rotatable between a first and a second position, a follower coupled to a grind shaft, the follower riding on the stepped detents, a rasp having a rasp grinding surface and being coupled at an end of the grind shaft, and a grinder ring coupled to the body and having a ring grinding surface. The rasp is operatively positionable between at least a coarse spacing and a fine spacing. When the grind adjuster is in the first position, the rasp grinding surface is at a course spacing from the ring grinding surface, and when the grind adjuster is in a second position, the rasp grinding surface is at a fine spacing from the ring grinding surface and the rotation of the adjuster relative to the body causes the follower to move between a first detent and a second detent.

DETAILED DESCRIPTION

In the following description, certain specific details are set forth in order to provide a thorough understanding of various embodiments of the invention. However, one skilled in the art will understand that the invention may be practiced without these details. In other instances, well-known structures associated with mills and grinding mechanisms have not been shown or described in detail to avoid unnecessarily obscuring descriptions of the embodiment of the invention.

Figure 1:
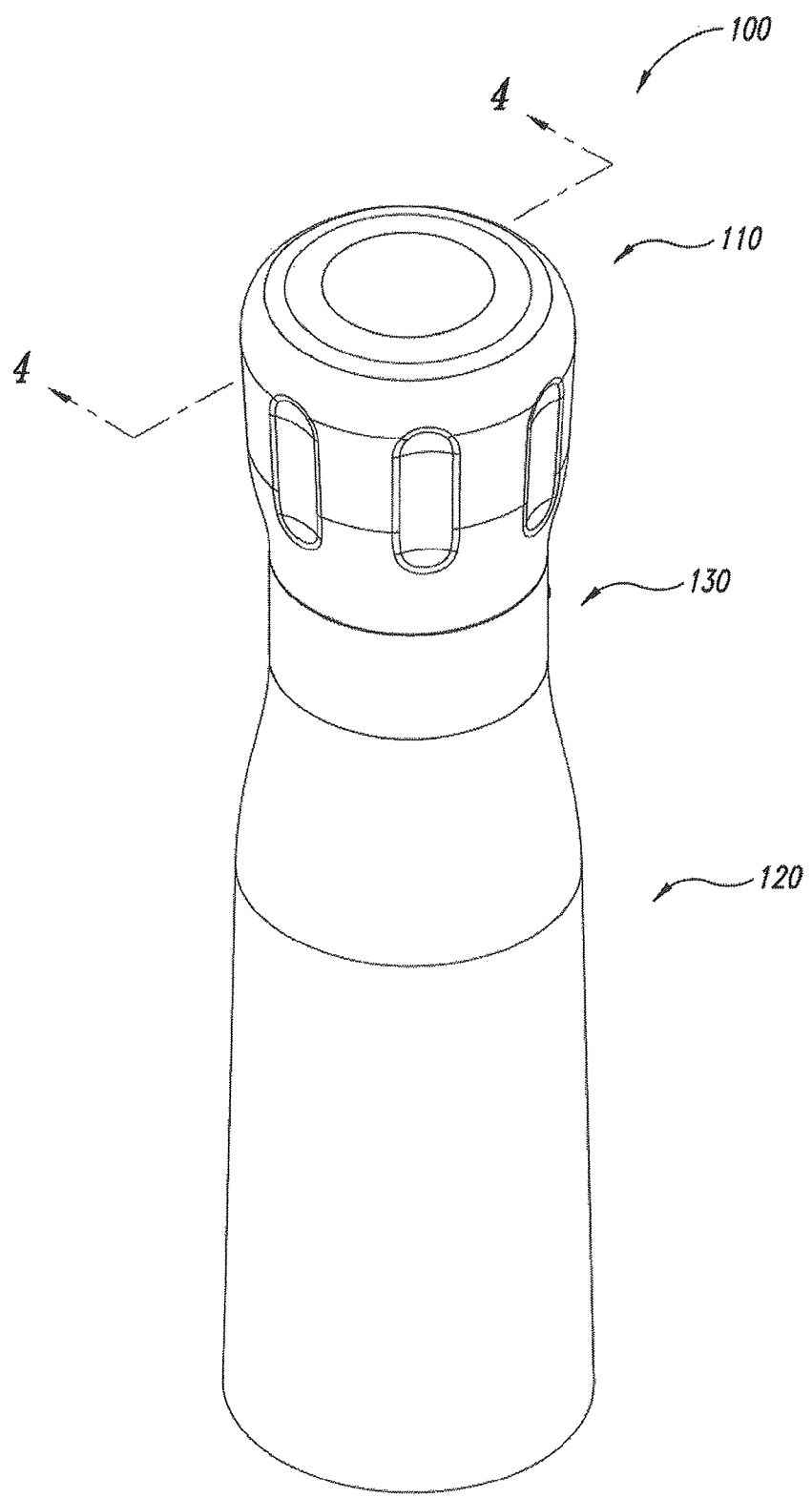
FIG. 1 is a side, top isometric view of a mill for grinding material such as spices and grain.

FIG. 1 shows a grinder or mill 100 for grinding a material such as spices or grains. The mill 100 includes an exterior body 120 and a turn knob assembly 110 coupled to each other. The body 120 and turn knob assembly 110 may be rotatably coupled to each other and rotate relative to each other about an axis of rotation, or longitudinal axis, when grinding material. See, for example, axis 'X' in FIG. 4.

Figure 2:
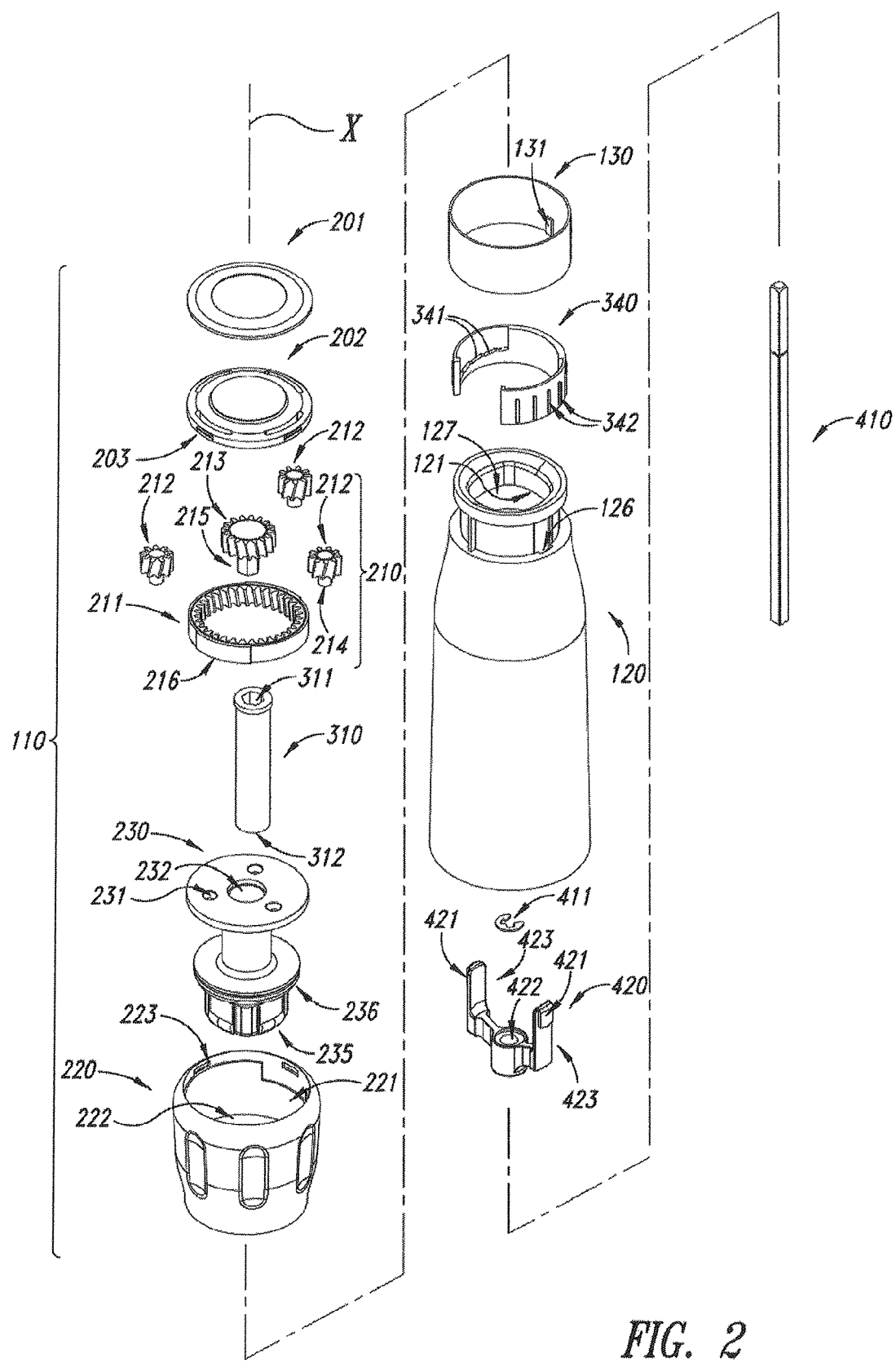
FIG. 2 is an exploded view of the external structure of the mill of FIG. 1, along with the planetary gear train and grind adjustment mechanism of the mill of FIG. 1.
Figure 3:
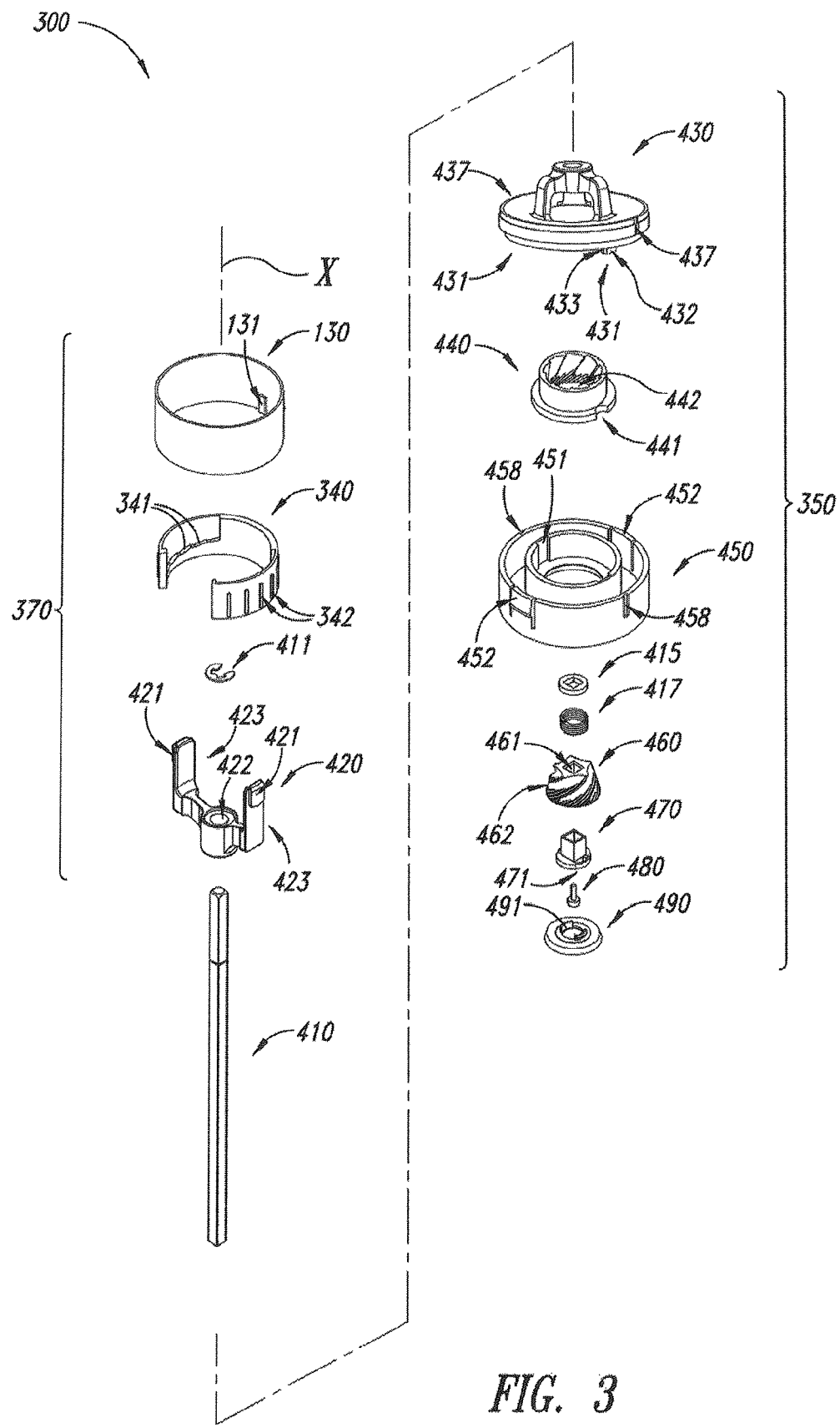
FIG. 3 is an exploded view of a grind adjustment mechanism and grind assembly of the mill of FIG. 1.

FIGS. 2 and 3 show an exploded view of the turn knob assembly 110 and portions of the lower body assembly 300 of the mill 100. In some embodiments, a turn knob includes a place for a user to grip the mill and turn or operate the grinding operation of the mill. In addition, in some embodiments, a turn knob may also include some or all of the gear mechanism for increasing the grinding speed of a mill. In still other embodiments, the turn knob is coupled to a gear mechanism that is located outside the turn knob, for example, in a body assembly.

In the embodiment of FIG. 2, the turn knob assembly 110 includes a speed boost assembly 210, a handle 220, a carrier 230, a shaft coupler 310, a top cover 202, and an accent cover 201. The speed boost assembly 210 depicted in FIG. 2 is a gear train and includes a set of gears that increases the speed and lowers the torque of the output gear as compared to the input gear. The embodiment of the speed boost assembly 210 of FIG. 2 is a planetary gear train, which is sometimes also referred to as an epicyclic gear train. A planetary gear train comprises an annular gear (or ring gear), a sun gear, and one or more planet gears supported by a carrier. The speed boost assembly 210 comprises a ring gear 211, a sun gear 213, and three planet gears 212. The carrier 230 supports the three planet gears 212.

Planetary gear trains typically have an input, an output, and a stationary or held gear or gear set. Different combinations of these three properties will change the gear ratio, output torque, and direction of rotation of the gears. For example, in the embodiment shown in FIGS. 2 and 4, the ring gear 211 is the input, the planet gears 212 are pinned to the stationary carrier 230, and the sun gear 213 is the output. In addition, in the embodiment of FIGS. 2 and 4, the ring gear 211 has 34 teeth, the sun gear 213 has 16 teeth, and the planet gears 212 have 9 teeth each. In this configuration, the gear ratio is calculated by dividing the number of teeth on the ring gear by the number of teeth on the sun gear. Thus, the speed boost assembly 210 has a gear ratio of 2.125:1. A gear ratio of 2.125:1 means that the output gear makes 2.125 rotations for each rotation of the input gear. As an additional example, if the handle 220 rotates at a rotational frequency of 0.5 rotations per second, the rasp 460 will rotate at a rotational frequency of 1.0625 rotations per second. In addition, the illustrated sun gear (the output gear) rotates in a direction opposite of the ring gear, the input. In some embodiments the gear ration may range between about 1.2:1 to about 3:1. In some embodiments the gear ratio is greater than 1.0:1, greater than 1.2:1, greater than 1.5:1, or greater than 2:1

In the embodiment shown in FIGS. 1 and 2, the handle 220 contains the speed boost assembly 210, the carrier 230, the shaft coupler 310, the top cover 202, and the accent cover 201. The carrier 230 sits within the cavity 222 of the handle 220. More particularly, a flange 236 on the carrier 230 sits on a flange 405 on the interior of the carrier 230 (see FIG. 4). Both of the flanges 236 and 405 may have a circular cross section such that the handle 220 may rotate relative to the carrier 230.

Additionally, tabs 235 of the carrier 230 work in cooperation with recesses 121 to releasable couple the carrier 230, and the rest of the turn knob assembly 110, to the body 120. The tabs 235 and recesses 121 may be arranged such that when the carrier 230 is coupled to the body 120, the carrier 230 may not rotate with respect to the body 120, but the turn handle 220 may rotate with respect to the carrier 230 and the body 120. This arrangement allows a user to remove the turn knob assembly 110 from the body 120 without disassembling any other parts of the mill and fill or refill the mill 100 with spices or grains through the aperture 127 in the upper end of the body 120.

Coupler 310 sits in cavity 232 of the carrier 230. The cavity 232 and coupler 310 can both have a circular cross section. This allows the coupler 310 to rotate with respect to the carrier 230. The sun gear 213 may include a coupling means 215 that helps couple the sun gear 213 to the shaft coupler 310. The coupling means 215 shown in FIG. 2 is a shaft with a hexagonal cross section that engages with a corresponding hexagonal shaped coupling means 311 located in the shaft coupler 310. The coupling means 215 and 311 may be non-circular or otherwise fixed such that the rotation of the sun gear 213 causes a corresponding rotation of the shaft coupler 310. In some embodiments, for example, the coupling means 215 and 311 may be of a generally circular cross section and may include a keyway and key that cause the shaft coupler 310 to rotate with the sun gear 213. The coupler 310 may also include a shaft coupling means 312 that couples the shaft coupler 310 to the grind shaft 410. In the illustrated embodiment, the grind shaft 410 and coupling means 312 have complementary square cross sections such that the grind shaft 410 may slide into the coupling means 312 and both the grind shaft 410 and shaft coupler 310 rotate with one another.

In some embodiments, the grind shaft 410 and sun gear 213 may be coupled directly to each other. In such embodiments, a shaft coupler 310 may not be necessary.

The carrier 230 and planet gears 212 also include coupling means 231 and 214, respectively, for coupling the planet gears 212 to the carrier 230. The planet gear coupling means may be a shaft or axle 214 that is concentric with an axis of rotation of the planet gear 212, while the carrier coupling means 231 may be a hole or aperture for receiving a shaft or axle. In some embodiments, the coupling means may be different, for example, the planet gear coupling means may be a hole or aperture for receiving a shaft or axle or the carrier coupling means may be a shaft or axle.

The ring gear 211 may be coupled or mounted to the handle 220 such that rotation of the handle 220 causes a corresponding rotation of the ring gear 211. For example, the exterior circumferential surface of the ring gear may include a protrusion 216 that interacts with a notch 221 on the interior surface of the handle 220 such that the ring gear 211 is coupled to or mounted to the handle 220. In some embodiments the ring gear 211 may be glued, welded, or otherwise affixed to the handle 220. In some embodiments the ring gear may be an integral part of the handle, for example, the ring gear 211 may be gear teeth formed or molded with and around the interior surface of the handle 220.

Finally, the turn knob assembly 110 may also include the top cover 202 and the accent cover 201. The top cover 202 can include protrusions 203 that releasably couple the top cover 202 to the handle 220 via corresponding notches 223 on an interior surface of the handle 220.

Figure 4:
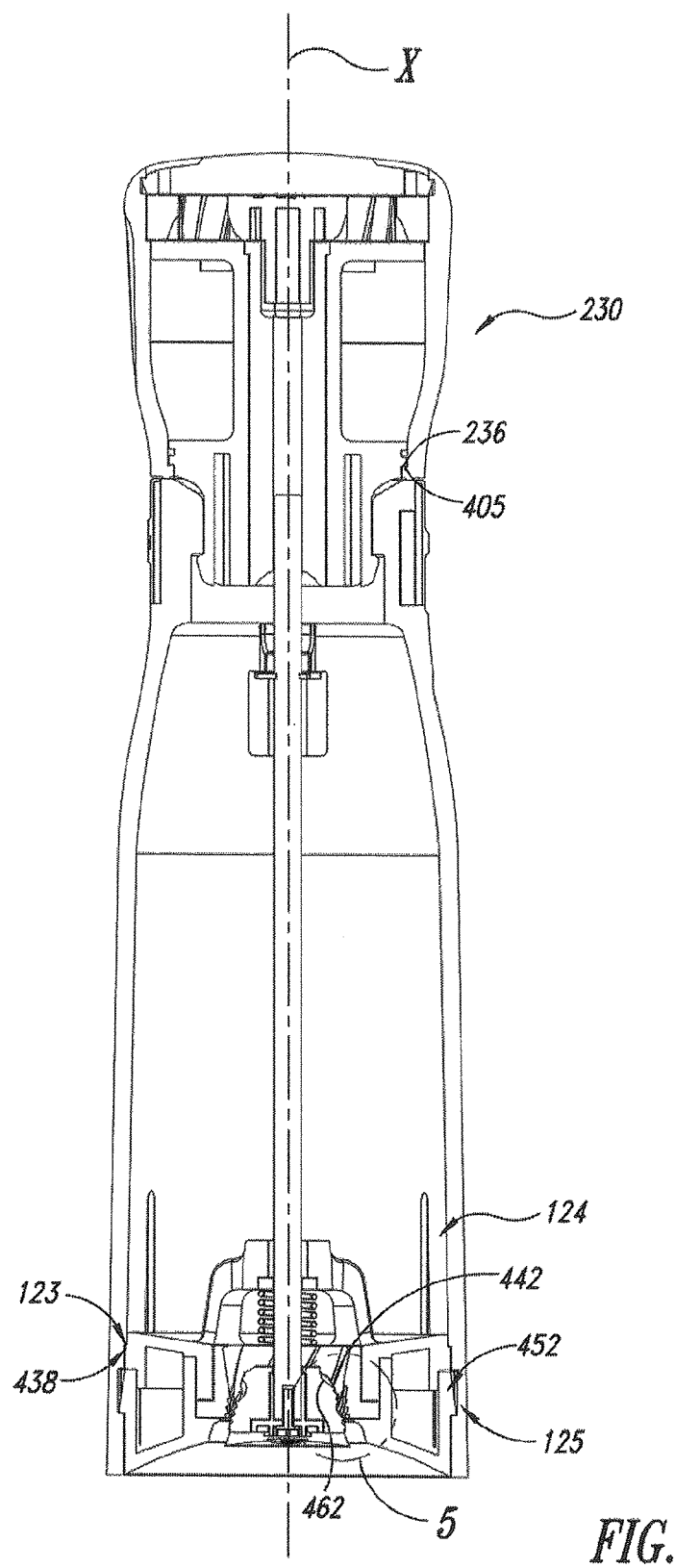
FIG. 4 is a cross-sectional view of the mill of FIG. 1 in an intermediate grind configuration.

In the embodiment shown in FIGS. 2 and 4, the turn knob assembly 110 and speed boost assembly 210 work together to drive the grind shaft 410. To use the mill 100 to grind spices or grains a user might hold the mill 100 in their hands. The user may grasp the body 120 in their non-dominant hand while grasping the turn knob assembly 110 in their dominant hand and rotating the handle 220 in a clockwise direction relative to the body 120.

Rotating the handle 220 clockwise relative to the body 120 causes the ring gear 211 to also rotate clockwise. The teeth of the ring gear 211 mesh with the teeth of the planet gears 212 such that the clockwise rotation of the ring gear 211 causes a clockwise rotation of the planet gears 212. The ring gear 211 to planet gear 212 gear ratio in the illustrated embodiment is 34:9. Thus, for every 9 rotations of the ring gear, the planet gears rotate 34 times. Although the planet gears 212 rotate about their axis of rotation, which may coincide with the central axis of their respective coupling means 214, the carrier 230 fixes the location of the planet gears 212 relative to the body 120.

The teeth of the planet gears 212 mesh with the teeth of the sun gear 213 such that the clockwise rotation of the planet gears 212 causes a counterclockwise rotation of the sun gear 213. The illustrated planet gear 212 to sun gear 213 gear ratio is 9:16. Thus, for every 16 rotations of the planet gears 212, the sun gear 213 rotates about its axis 9 times. This gear arrangement gives an overall gear ratio, from the ring gear 211 input to the sun gear 213 output, of 34:16 or 2.125:1. Thus, as indicated above, for every one rotation of the ring gear 211, the sun gear rotates 2.125 times.

The sun gear 213 connects to the grind shaft 410 which connects to the rasp 460 such that the rotation of the sun gear 213 causes the rasp 460 to rotate relative to the grind ring 440 (see FIGS. 3 and 4). The rotation of the rasp 460 relative to the grind ring 440 grinds or mills the spices or grains contained within the mill 100.

The Applicant has surprisingly found that, contrary to conventional understanding, users do not need increased torque to mill grains and spices. Applicants have found that, in certain circumstances, users prefer a mill that increases the output speed of the rasp as compared to the input speed at the turn knob and they easily grind spices and grains, even with the reduction in output torque.

Referring now to FIGS. 3 and 4, the body assembly 300 includes a grind assembly 350 and a grind adjustment assembly 370. The grind assembly 350 includes a grind ring 440 and a rasp 460, among other parts.

A grind ring frame 430, grind ring 440, and base capture 450 can use a series of alignment keys and key slots, along with a flange and a retention mechanism, to hold the grind ring 440 in place and prevent its rotation relative to the exterior body 120 of the mill 100. The grind ring frame 430 sits in the interior of the exterior body 120 and uses keyways 437 that interface with keys 124 on the lower interior surface of the exterior body 120 to prevent the grind ring frame 430 from rotating. In addition, an upper portion 438 of the circumference of the grind ring frame 430 may rest on the shoulder 123 of the exterior body 120 (see FIG. 4). This arrangement may prevent the grind ring frame 430 from moving in a longitudinal direction, e.g., along or parallel to axis 'X', shown in FIG. 4.

The grind ring frame 430 may also include a two-sided key 431. The two-sided key 431 may include a first side 432 configured to interface with keyway 451 of the base capture 450 and a second side 433 configured to interface with the keyway 441 of the grind ring 440. The base capture 450 may also include keyways 458 that interface with keys 124 on the lower interior surface of the exterior body 120 to prevent the base capture from rotating. In addition, the base capture 450 may include retention tabs 452 that interface with recess 125 to couple the base capture 450 to the exterior body 120 and prevent the base capture 450 from moving in a longitudinal direction. Thus, the lower portion of the exterior body 120 retains the grind ring frame 430 and the base capture 450 and prevents them from moving laterally or rotating with respect to the exterior body 120. In addition, the grind ring 441 is captured between the grind ring frame 430 and base capture 450 to prevent longitudinal movement while the keys 431 interface with the keyway 441 to prevent the grind ring 440 from rotating with respect to the body 120.

The rasp 460 is retained at the end of the grind shaft 410 and within the rasp ring 440 by a rasp screw 480 and rasp cap 490. A washer 415, spring 417, rasp 460, and rasp bushing 470 slide over an end of the grind shaft 410. The rasp screw 480 couples the rasp bushing 470 to the grind shaft 410. The bushing 470, in turn, couples the rasp 460 to the grind shaft 410. The rasp 460 and washer 415 capture the spring 417 on the grind shaft 410. The grind ring frame 430 captures the bushing 470 and prevents it from moving longitudinally up the grind shaft 410. In this way, the spring 417 pushes against the bottom of the grind ring frame 430, which is held by the body 120, and the top of the rasp 460 such that the rasp 460 and the grind shaft 410 to which it is attached, are pushed downward and away from the grind ring frame 430. In addition, the cross-sectional shape of the shaft hole 461 can be substantially similar to that of the grind shaft 410 such that rotation of the grind shaft 410 causes the rasp 460 to rotate.

Finally, a retention tab 491 and recess 471 couple the rasp cap 490 and rasp bushing 470 together in an arrangement similar to that of the base capture 450 and exterior body 120 coupling.

The mill 100 may also include a grind adjustment mechanism. Because some recipes or cooking styles require spices and grains ground to different sizes and because preferences among consumers may vary, a single mill may need to grind spices and grains into more than one size. A mill may include a grind adjustment mechanism to adjust the grinding size or coarseness of the ground material. For example, in the embodiment shown in the figures, one embodiment of a grind adjustment mechanism is shown and it includes an external, or accent ring 130, an adjuster 340, a follower 421, a coupler 411, and a grind shaft 410.

The adjuster 340 includes a set of stepped detents 341 on which a follower 421 rides. The follower 421 may be integrated into a coupler or adjuster frame 420 for coupling the follower 421 to a grind shaft 410. In some embodiments, the follower 421 may be directly coupled to the shaft 410 or integrated into the shaft. In the embodiment of FIG. 2, the frame is coupled to the grind shaft via aperture 422 and coupler 411. In the embodiment shown in FIGS. 3 and 4, the adjuster frame 420 includes to two followers 421. The followers 421 are located at opposite ends of the frame 420 on arms 423 and may ride in a set of stepped detents 341 located on radially opposed sides of the adjuster 340. Using a set of two followers 421, balances the load on the frame 420 and helps prevent it from jamming.

The arms 423 of the frame 420 may be engaged with or pass through slots 126 in the body 120.

The grind setting of the mill is adjusted by rotating the accent ring 130, which is rotatably coupled to the adjuster 340 by key 131. The key 131 sits between two protrusions 342. Rotating the accent ring 130 will cause the key 131 to contact one of the protrusions 342, which can thus cause the adjuster 340 to rotate. When the adjuster 340 rotates, the follower 421 rides up or down between the stepped detents 341. Rotation of the adjuster 340 may not cause rotation in the follower 421 because the slots 126, through which the arms 423 pass, oppose rotation of the arms 423 and thus the follower 421. As the follower 421 rides up or down on the stepped detents 341 it acts on the grind shaft 410 and causes it to translate along the longitudinal axis X of the mill 100. In the embodiment shown in FIGS. 3 and 4, the follower 421 is part of the frame 420, which is coupled to the shaft 410 via coupler 411, which may be an e-clip. Thus, when the follower rides up the stepped detents, the frame 420 pushes up on the coupler 411, which causes the shaft 410 to translate upward. Riding down on the stepped detents allows the shaft 410, which is forced downward by the spring 417 acting on the rasp 460, to translate downward.

The upward and downward translation of the shaft 410 causes the rasp 460, which is coupled to an end of the shaft 410, to also translate upward and downward. As explained below, the upward and downward translation of the rasp 460 causes a distance, for example distance 'A,' to change. Distance A may be a distance between a location 443 on surface 442 of the grind ring 440 and a location 463 on surface 462 of the rasp 460. A small distance A may correspond to the mill 100 producing finely ground material while a large distance A may correspond to a large or coarsely ground material.

Distance A may change as the rasp 460 translates longitudinally because it may have a shape, such as a conical shape, that causes the grinding surface 462 of the rasp 460 to move away from the grinding surface 442 of the grind ring 440 as the rasp 460 translates downward.

Figure 5:
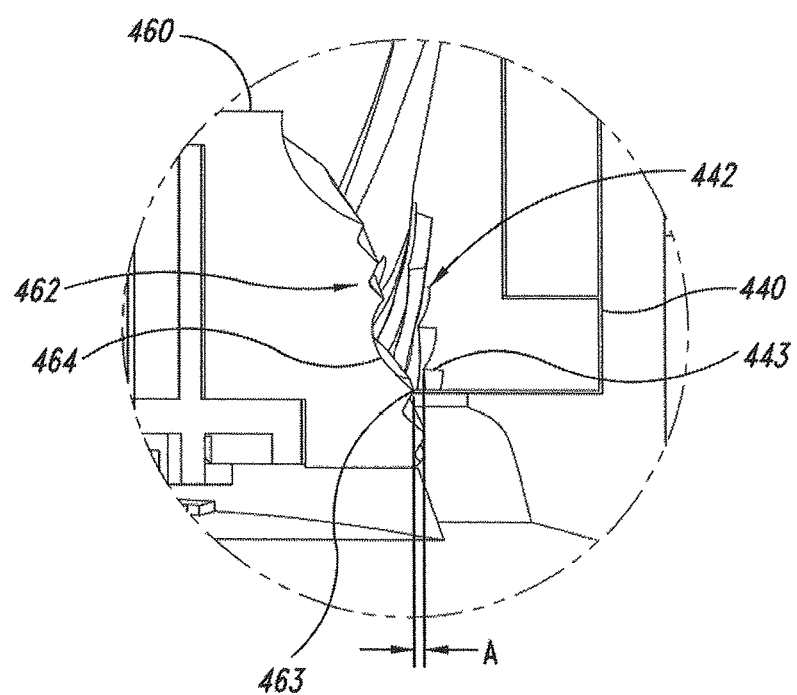
FIG. 5 is an enlarged view of a portion of the mill of FIG. 4.

An at least partially conical shaped rasp 460 facilitates an increasing distance A as the rasp 460 translates along the longitudinal axis. This occurs because the diameter of a location on the grind ring 440, such as the discharge location 443, is fixed, while the diameter of the rasp 460 located near the discharge location 443 decreases as the rasp 460 translates downwards. For example, FIG. 5 shows that location 463 of the rasp surface 460 is closest to the discharge location 443 of the grind ring 440, but when the rasp 460 translates longitudinally downward, location 464 may be closest to the discharge location 443. At location 464 of the rasp surface 462, the rasp 460 has a smaller diameter than it does at location 463. Thus, when location 463 is closest to the discharge location 443, the mill 100 will grind material more coarsely than when location 463 is closest to the discharge location 443.

Finally, the arrangement of the accent ring 130 and adjuster 340 between the body 120 and the turn knob assembly 110 allows a user to quickly and easily adjust the grind coarseness. A user simply slides their dominant hand from the handle 220 to the accent ring 130, rotates the accent ring 130 to adjust the grind, and then slides their hand back to the handle and resumes grinding.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A mill for grinding a spice or grain material, comprising:
   a body;
   a handle rotatably coupled to the body;
   the handle also coupled to an input of a speed boost assembly;
   an output of the speed boost assembly being coupled to a grind assembly;
   the grind assembly including a rasp;
   the speed boost assembly configured to cause a rotational displacement of the rasp to be greater than a rotational displacement of the handle.

2. The mill of claim 1, wherein the speed boost assembly is a planetary gear train.

3. The mill of claim 2, wherein the planetary gear train has a gear ratio between about 1.2:1 and about 3:1.

4. The mill of claim 2, wherein the planetary gear train has a gear ratio of about 2.125:1.

5. The mill of claim 2, wherein the planetary gear train includes a ring gear, a sun gear, and at least one planet gear;
   wherein the ring gear is fixedly coupled to an interior of the handle to rotate as a unit therewith.

6. The mill of claim 5, further comprising a carrier coupled to the body and the at least one planet gear rotatably coupled to the carrier.

7. The mill of claim 1, further comprising a turn knob assembly;
   the turn knob assembly comprising the handle and the speed boost assembly;
   wherein the speed boost assembly is contained within an interior of the turn knob assembly.

8. The mill of claim 7, wherein the turn knob assembly is releasably coupled to the body without requiring disassembly of any other parts of the mill.

9. A mill for grinding a spice or grain material, comprising:
   a body;
   a grind adjuster including at least one set of stepped detents and being rotatable between a first and a second position;
   a follower coupled to a grind shaft, the follower riding on the stepped detents;
   a rasp having a rasp grinding surface and being coupled at an end of the grind shaft; and
   a grinder ring coupled to the body and having a ring grinding surface;
   wherein the rasp is operatively positionable between at least a coarse spacing and a fine spacing;
   wherein when the grind adjuster is in the first position, the rasp grinding surface is at a coarse spacing from the ring grinding surface and when the grind adjuster is in a second position, the rasp grinding surface is at a fine spacing from the ring grinding surface; and
   wherein rotation of the grind adjuster relative to the body causes the follower to move between a first detent and a second detent.

10. The mill of claim 9, wherein the grind adjuster includes a pair of radially opposed stepped detents.

11. The mill of claim 10, further comprising an adjuster frame;
   the adjuster frame including a pair of radially opposed followers.

* * * * *